United States Patent
Dalla Betta

(10) Patent No.: US 6,698,412 B2
(45) Date of Patent: Mar. 2, 2004

(54) CATALYST PLACEMENT IN COMBUSTION CYLINDER FOR REDUCTION ON NOX AND PARTICULATE SOOT

(75) Inventor: Ralph Dalla Betta, Mountain View, CA (US)

(73) Assignee: Catalytica Energy Systems, Inc., Mountain View, CA (US)

( * ) Notice: Subject to any disclaimer, the term of this patent is extended or adjusted under 35 U.S.C. 154(b) by 0 days.

(21) Appl. No.: 10/043,630

(22) Filed: Jan. 8, 2002

(65) Prior Publication Data

US 2002/0179040 A1 Dec. 5, 2002

Related U.S. Application Data

(60) Provisional application No. 60/260,739, filed on Jan. 9, 2001, and provisional application No. 60/260,493, filed on Jan. 8, 2001.

(51) Int. Cl.$^7$ ................................................ F02B 51/02
(52) U.S. Cl. ..................... 123/670; 123/272; 123/297
(58) Field of Search ................ 123/297, 272, 123/670

(56) References Cited

U.S. PATENT DOCUMENTS

| 3,752,137 A | * | 8/1973 | Kimberley | .................. 123/496 |
| 3,923,011 A | | 12/1975 | Pfefferle | |
| 4,002,151 A | | 1/1977 | Toyoda et al. | |

(List continued on next page.)

FOREIGN PATENT DOCUMENTS

| EP | 0 113 592 | | 7/1984 |
| GB | 2 186 913 A | | 8/1987 |
| JP | 60-147524 A | * | 8/1985 |

OTHER PUBLICATIONS

Anonymous, (visited on Jan. 2, 2002) "The aero–news network daily news brief" *TechLink–New Articles* located at <http://techlink.msu.montana.edu/articles/smartplugs–betteridea.html>, 4 pages.

Anonymous, (visited on Mar. 21, 2002) "The aero–new network daily news brief" *SmartPlugs—Aviation*, located at <http://www.smartplugs.com/news/aeronews0900.htm>, 3 pages.

Anonymous, (visited on Jan. 2, 2002) "Clark catalyst technology cuts automotive emissions" *The Autoparts Report*, Source: Autoparts Report Date: Oct. 1995, Document Size: Very Short (359 words) Document ID: PN9990802100101005 Citation Information: (ISSN: 1045–1978), vol. 9 No. 19 Pg. N/A Copyright Holder: 1995, International Trade Services Document Type: Article 2 pages, located at <http://library.northernlight.com/PNI19990802100101005.html?cbx0&scx0#doc>.

Flynn, Patrick F. et al. (2000). "Minimum Engine Flame Temperature Impacts on Diesel and Spark–Ignition Engine NOx Production," *SAE Technical Paper Series 2000–01–1177, SAE 2000 World Congress Detroit, Michigan*, Mar. 6–9, 2000, pp. 1–12.

(List continued on next page.)

*Primary Examiner*—Noah P. Kamen
(74) *Attorney, Agent, or Firm*—Morrison & Foerster LLP

(57) ABSTRACT

Catalyst structure, engine, and fuel injection system are disclosed, in which a catalyst structure is positioned between a fuel injector and a combustion chamber in which most or all combustion occurs. The catalyst structure typically promotes some combustion of the fuel, reforming of fuel to generate hydrogen and other reduced species of fuel molecules, or both. The catalyst structure may instead or additionally promote evaporation of fuel droplets. Benefits include reduced emissions of pollutants.

24 Claims, 5 Drawing Sheets

U.S. PATENT DOCUMENTS

Jones, Robert L. (1997). "Surface and Coatings Effects in Catalytic Combustion in Internal Combustion Engines," *Surfaces and Coatings Tech.* 94–95:118–122.

| | | | |
|---|---|---|---|
| 4,223,645 A | | 9/1980 | Nohira et al. |
| 4,345,545 A | | 8/1982 | Miller |
| 4,345,555 A | * | 8/1982 | Oshima et al. ......... 123/145 A |
| 4,480,613 A | | 11/1984 | Siewert |
| 4,715,347 A | | 12/1987 | Hampton et al. |
| 4,759,319 A | | 7/1988 | Merritt |
| 4,819,595 A | * | 4/1989 | Pfefferle .................... 123/272 |
| 4,896,636 A | | 1/1990 | Pfefferle |
| 5,113,806 A | | 5/1992 | Rodart |
| 5,146,881 A | | 9/1992 | Pfefferle |
| 5,183,401 A | | 2/1993 | Dalla Betta et al. |
| 5,186,137 A | | 2/1993 | Salzmann |
| 5,232,357 A | | 8/1993 | Dalla Betta et al. |
| 5,250,489 A | | 10/1993 | Dalla Betta et al. |
| 5,258,349 A | | 11/1993 | Dalla Betta et al. |
| 5,281,128 A | | 1/1994 | Dalla Betta et al. |
| 5,307,772 A | * | 5/1994 | Rao et al. ................... 123/272 |
| 5,425,632 A | | 6/1995 | Kazunori et al. |
| 5,511,972 A | | 4/1996 | Dalla Betta et al. |
| 5,512,250 A | | 4/1996 | Betta et al. |
| 5,518,697 A | * | 5/1996 | Dalla Betta et al. ........ 165/166 |
| 5,560,326 A | | 10/1996 | Merritt |
| 5,593,607 A | | 1/1997 | Dam et al. |
| 5,695,328 A | | 12/1997 | DeFreitas et al. |
| 5,806,483 A | | 9/1998 | Mitarai et al. |
| 6,058,918 A | | 5/2000 | Noetzlin |
| 6,109,018 A | | 8/2000 | Rostrup-Nielsen et al. |
| 6,116,014 A | | 9/2000 | Dalla Betta et al. |
| 6,158,222 A | * | 12/2000 | Retallick ....................... 431/7 |
| 6,205,985 B1 | | 3/2001 | Funagayama |
| 6,298,825 B1 | | 10/2001 | Hupperich et al. |

OTHER PUBLICATIONS

Lefebvre, A. H. (1983) *Gas Turbine Combustion*, Hemisphere Publishing Corporation, McGraw–Hill Book Company, pp. 48 and 192.

Nedunchezhian, N. and Dhandapan, S. (2000). "Heat Release Analysis of Lean Burn Catalytic Combustion in a Two–Stroke Spark Ignition Engine," *Combustion Science and Tech.* 155:181–201.

Thring, R. H. (Jan. 1980). "The Catalytic Engine: Platinum Improves Economy and Reduces Pollutants from a Range of Fuels," *Platinum Metals Review* 24(1):126–133.

* cited by examiner

CATALYST PLACEMENT IN COMBUSTION CYLINDER FOR REDUCTION ON NOX AND PARTICULATE SOOT

This application claims the benefit of priority to U.S. Ser. No. 60/260,493, filed Jan. 8, 2001, and to U.S. Ser. No. 60/260,739, filed Jan. 9, 2001, both of which are entitled "Catalyst Placement In Combustion Cylinder For Reduction Of NOx And Particulate Soot" and both of which are incorporated by reference herein in their entirety.

BACKGROUND OF THE INVENTION

The combustion of liquid fuels in a diesel engine typically leads to the formation of large amounts of nitrogen oxides and particulate soot emissions. It is desired to reduce these emissions.

Catalytic combustion technology has been applied to continuous combustion processes in which a fuel air mixture is continuously passed over a catalyst and all or a portion of this fuel is combusted in the catalyst. In a series of recent patents, U.S. Pat. No. 5,183,401 to Dalla Betta et al.; U.S. Pat. No. 5,232,357 to Dalla Betta et al.; U.S. Pat. No. 5,250,489 to Dalla Betta et al.; U.S. Pat. No. 5,281,128 to Dalla Betta et al.; and U.S. Pat. No. 5,425,632 to Tsurumi et al., catalytic combustion systems are described in which the fuel is partially combusted on a catalyst and the remaining fuel combusted downstream of the catalyst with little NOx formation since the fuel air mixture is very uniform and there are no peaks in temperature.

Unfortunately, such systems are not readily adaptable to diesel fuels (where NOx formation is very high) since in a diesel engine the fuel is a liquid with a rather high boiling point and such liquid fuel is injected directly into the cylinder when the piston is at the top of the compression stroke. Specifically, the diesel cycle depends on so called "compression ignition" (i.e.: the ignition of the fuel-air mixture upon injection of the fuel into the high pressure, hot air environment at the top of the compression stroke).

Moreover, emissions from a diesel engine result from the diesel cycle, (i.e.: from the direct injection of the diesel fuel into the hot, high pressure air in the cylinder). Some portion of the fuel vaporizes and the combustion occurs in the near stoichiometric fuel air mixture around the liquid droplet. As this fuel burns, it burns in this near stoichiometric region resulting in a very high flame temperature and high NOx. In addition, as the flame heats the liquid droplet, the droplet begins to pyrolyze and can thus form particulate matter that may not burn before the combustion products exit the engine. This also results in high levels of particulate emissions.

Modifications to diesel combustion process are thus desired to minimize the NOx and carbon particulate emissions. Unfortunately, various existing emission control processes have their own limitations.

For example, although engine modifications have helped to reduce emissions significantly, the future benefit from further engine modifications appears to be minimal. For instance, some of the approaches such as exhaust gas recirculation and staged or stratified combustion have not resulted in significant reduction in NOx. Moreover, trap and release technology treats the NOx emissions after they are formed. While trap and release approaches can reduce NOx, they are very costly and necessitate mechanically intensive systems that can significantly increase fuel consumption for the engine since the reductant is formed by either injecting raw fuel directly into the catalyst system to generate a reducing environment or by running the engine rich which is not optimal for a diesel engine.

A variety of existing emission control processes and their limitations are set forth below.

| Approach | NOx reduction | Current status/Disadvantages |
| --- | --- | --- |
| 1. Engine modifications | (low) | Extensively developed over the past 15 years. Appears to be near limit and future significant NOx or particulate reductions are not expected. |
| 2. Trap and release | 50 to 80% | Catalysts are poisoned by sulfur and show poor durability. Requires reductant injection and may have drivability problems. Does not address the particulate problem which would require a separate particulate trap system. High cost and mechanically complicated. Fuel efficiency penalty. |
| 3. NOx decomposition | 50 to 70% | Poor catalyst durability and sulfur sensitivity. Requires reductant addition. Does not address particulate problem. Moderate cost and high fuel efficiency penalty. |

U.S. Pat. No. 5,307,772 describes a catalyst placed in the combustion chamber of a diesel engine, specifically in a prechamber or in the throat between the prechamber and the main cylinder chamber of an indirect injection engine or in the top of the piston of a direct injection engine. The prechamber of the indirect injection engine has a large volume and as described in the '772 patent a significant amount of the combustion occurs in this prechamber. The catalyst described in the present invention may be much smaller than the catalyst of the '772 patent and is placed between the fuel injector and the main combustion chamber in which the majority of combustion takes place. The fuel is injected through the catalyst with very little of the fuel combusting in the region between the injector and the catalyst. Some portion of the fuel is combusted within the catalyst and most of the fuel is combusted after or downstream of the catalyst in the main chamber. In the '772 patent, the major amounts of NOx are said to be formed in the prechamber and then to pass through the catalyst on the way to the prechamber. According to this reference, this mixture is reducing and the catalyst is designed to reduce the NOx to $N_2$. While this may reduce a portion of the NOx it would not impact the NOx formation during the remainder of the combustion process in the main part of the cylinder. In addition, the catalyst of the '772 patent is described as being contained in a prechamber and prechamber engines have severe disadvantages, in particular, lower efficiency. The low efficiency is partly due to the pressure drop or flow restriction as the combustion gases flow from the prechamber to the main chamber. Lastly, the catalyst described in the '772 patent consists of a ceramic monolith and is fully coated with catalyst on all surfaces, and all channels are continuous from inlet to outlet. The '772 patent does not envision that a catalyst can be configured to impact the combustion process by vaporizing the fuel, nor does it envision a catalyst that could partially reform the fuel to produce components that would advantageously impact the combustion process. In addition, this patent does not envision that a catalyst could be designed that would limit the combustion temperature by using adjacent channels with no catalyst coating to act as heat exchange surfaces.

Another patent, GB 2 186 913 describes a catalyst coating on the internal surfaces of new engine design using two pistons acting in some concerted fashion. This catalyst is used only to initiate combustion. Numerous patents have also been issued which describe glow plugs for diesel engines with catalyst coatings or catalytic wires on the surface of the glow plug. See for example U.S. Pat. Nos. 4,345,555, 4,896,636, 5,146,881 and 5,593,607. In all cases, these patents describe a glow plug with increased performance. ascribed to the catalyst coating but do not describe any action of the catalyst to vaporize the fuel, further mix it with the air charge or to chemically process the fuel to more desirable components. In addition, none of these references describe a monolithic catalyst unit that is just downstream of the fuel injector and through which a major fraction of the fuel passes.

SUMMARY OF THE INVENTION

In a preferred aspect, the present invention comprises positioning a catalyst within the combustion chamber of diesel engine, preferably just downstream of the fuel injector.

The present invention offers the following advantages:

When fuel is injected into the diesel engine, the liquid fuel droplets impact the catalyst and will be partially oxidized with the release of heat assisting to vaporize the liquid droplets to form vapor phase fuel components. The resulting fuel air mixture that passes into the combustion chamber will therefore be at a high temperature and will result in a more uniform mixture of fuel and air. This more uniform mixture of fuel and air will combust with the formation of lower levels of nitrogen oxide emissions and particulate soot.

It is to be understood that the exact catalyst used in the present invention can take a number of different novel forms all of which are inventive within the scope of the present invention.

In contrast to the above examples, the present invention sets forth a system with the following characteristics:

| Approach | NOx reduction | Current status/Advantages |
|---|---|---|
| In-engine catalyst (the present invention) | 75 to 90% | Proven in gas turbines. No sulfur sensitivity and no need for reductant addition. Low cost. |

DESCRIPTION OF THE SPECIFIC EMBODIMENTS

In accordance with a preferred aspect of the present invention, a catalyst is positioned within a combustion chamber at a location downstream of the fuel injector.

Advantages of the present novel use of a catalyst within the cylinder and the design of the catalyst structure may include the following:

Partial or complete vaporization of the fuel spray prior to the majority of the fuel moving into the cylinder region.

Catalytic combustion of some portion of the fuel, for example ~50%, with no NOx formation prior to ignition of the fuel in the main cylinder space.

Catalytic combustion of a portion of the fuel resulting in a higher temperature fuel air mixture in the main cylinder space resulting in the ability to operate with leaner fuel air mixtures.

Significant mixing of the fuel with the air charge prior to ignition of the fuel in the main cylinder space Homogeneous combustion (radical flame combustion) of the remaining fuel premixed with air resulting in a low flame temperature and low NOx production.

Figure 1:
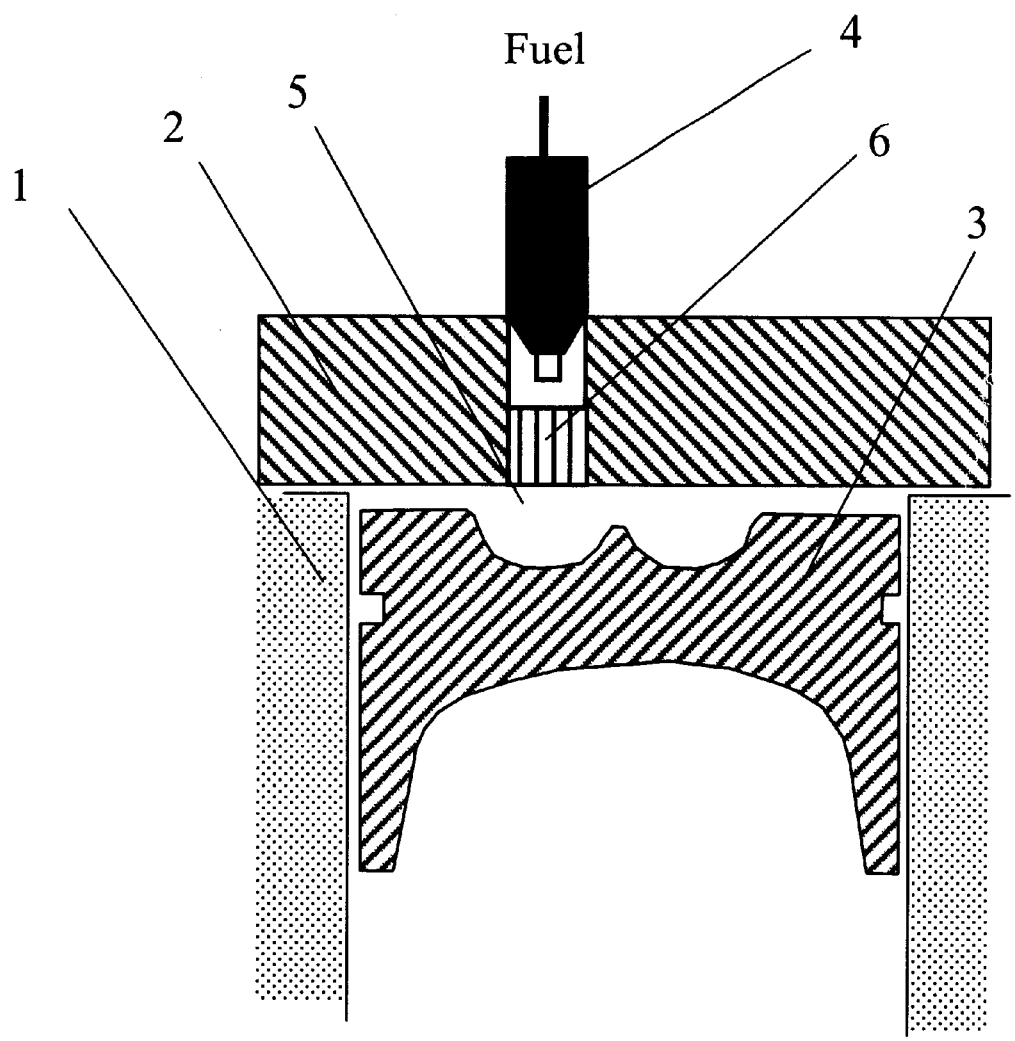
FIG. 1 is a schematic elevation view of the present system for positioning a catalyst within a combustion chamber at a location downstream of a fuel injector.

The present device and method locates a catalyst downstream of the fuel injector as shown schematically in FIG. 1 where the cylinder wall 1 and cylinder head 2 of the engine contains piston 3. The fuel injector 4 injects fuel into the cylinder chamber 5 of the engine. Catalyst 6 is positioned at a location downstream of the fuel injector as shown, such that injector 4 injects fuel through the catalyst.

Operation and use of the present system will now be described in relation to FIGS. 2a to 2d.

FIG. 2a illustrates the engine compression stroke. During the engine compression stroke, piston 21 rises inside cylinder 22, thereby compressing the air inside the cylinder head. As this air is compressed, it is heated by the adiabatic compression process. As the air is compressed, a portion of the hot air 23 is then forced into the monolithic catalyst 24 and into open space 25 between the catalyst and the fuel injector 26. The passage of this hot air into and through the catalyst will act to raise the temperature of the catalyst.

At the position shown in FIG. 2b, piston 21 reaches the top of its stroke, and fuel is injected via fuel injector 26. Fuel injection can occur some time before the piston is at the top of its travel or sometime after it is at the top of its travel. Fuel spray 27 consists of droplets of liquid fuel, which may preferably be injected in a spray pattern that covers a significant portion of catalyst 24's injector side surface 28. Since catalyst unit 24 is active for the catalytic combustion of the fuel, and because there is oxygen present and the catalyst and gas mixture are at a high temperature, a portion of the fuel (from spray 27) is catalytically reacted on catalyst inlet surface 28 and throughout the channels of the catalyst to combust or partially combust the fuel and form carbon oxides and water.

This catalytic reaction of fuel and oxygen will release significant heat and cause expansion of the gas as shown in FIG. 2c, thereby driving the hot gas mixture out of the catalyst. A portion of this expelled mixture 29 may go toward injector 26 but the major portion 30 will go into the main combustion chamber 22. These expelled hot gas mixtures 29 and 30 will consist of hot combustion products as well as unreacted fuel and air. After some period of time, the fuel air mixture will ignite in the conventional diesel combustion portion of the cycle as shown in FIG. 2d where the radical combustion reaction 31 produces hot gases and high pressure to drive the engine power stroke.

An advantage of the present system is that the fuel combustion processes will preferably occur both during the fuel injection step and immediately after fuel injection. Specifically, when fuel is injected (FIG. 2b), the liquid fuel droplets impact on the hot catalyst surfaces (including top surface 28), thereby accelerating the evaporation of the fuel. Since a portion of the catalyst surface will be covered with catalyst, these surfaces will begin to catalyze the reaction of the fuel and oxygen to form water and carbon oxides. This exothermic catalytic reaction will further heat the catalyst and accelerate the evaporation process. Advantageously, this catalytic reaction of fuel and oxygen proceeds without the formation of NOx. In addition, the partial vaporization of the fuel will aid in mixing of the fuel and air. As the hot fuel air mixture is ejected into the main combustion chamber (FIG. 2c) the vaporized fuel will further mix with the air leading to a better premixing of the fuel and air charge. Subsequent gas phase combustion (FIG. 2d) may then advantageously produce lower NOx because it is more well mixed and reduced carbon particulates because more of the fuel is vaporized to eliminate liquid droplets. This combination of processes, partial catalytic combustion and homogeneous radical combustion of a premixed fuel air mixture, may advantageously substantially reduce the level of NOx and particulates.

An additional advantage of the inventive device would be to process the fuel into preferred components within the catalyst unit prior to the combustion part of the cycle. For example, during fuel injection as shown in FIG. 2b, the composition of fuel and air within the catalyst unit could be essentially reducing, that is, the total fuel residing within the catalyst unit could be in excess of the oxygen so that full combustion to $CO_2$ and $H_2O$ is not possible. A portion of the fuel would combust to $CO_2$ and $H_2O$ and some portion would be reformed to CO and $H_2$. This $H_2$ could advantageously improve the combustion process by increasing the flame speed and lowering the minimum fuel air ratio at which the engine can be operated. This would give a lower NOx emissions level.

Figure 2:
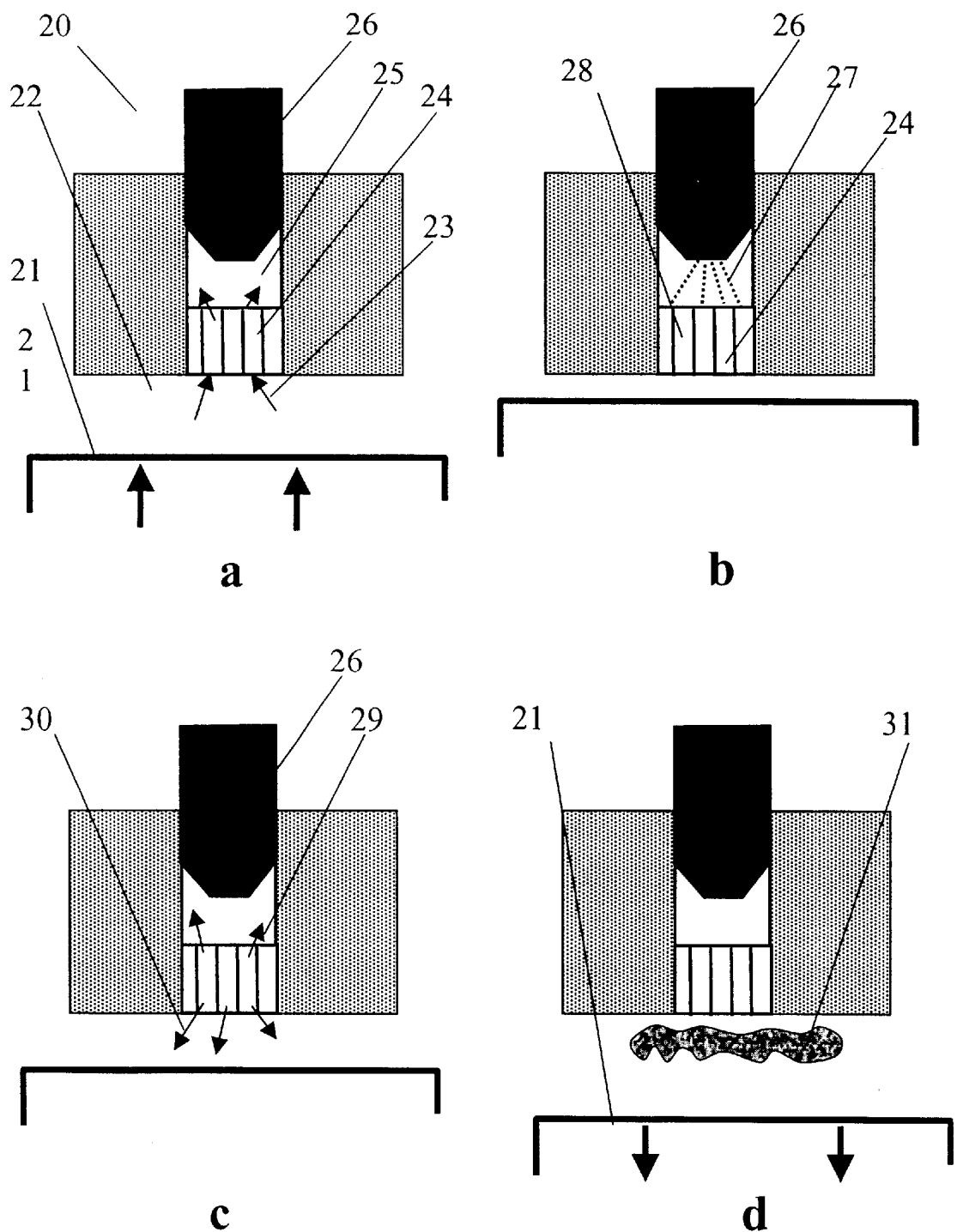
FIGS. 2a to 2d are successive illustrations of the operation of the present inventions through the compression and ignition portion of the diesel engine cycle, as follows:
2a—compression stroke
2b—injection of the fuel
2c—partial reaction of the fuel and air on the catalyst
2d—ignition of the fuel air mixture in the free space above the piston.
Figure 3:
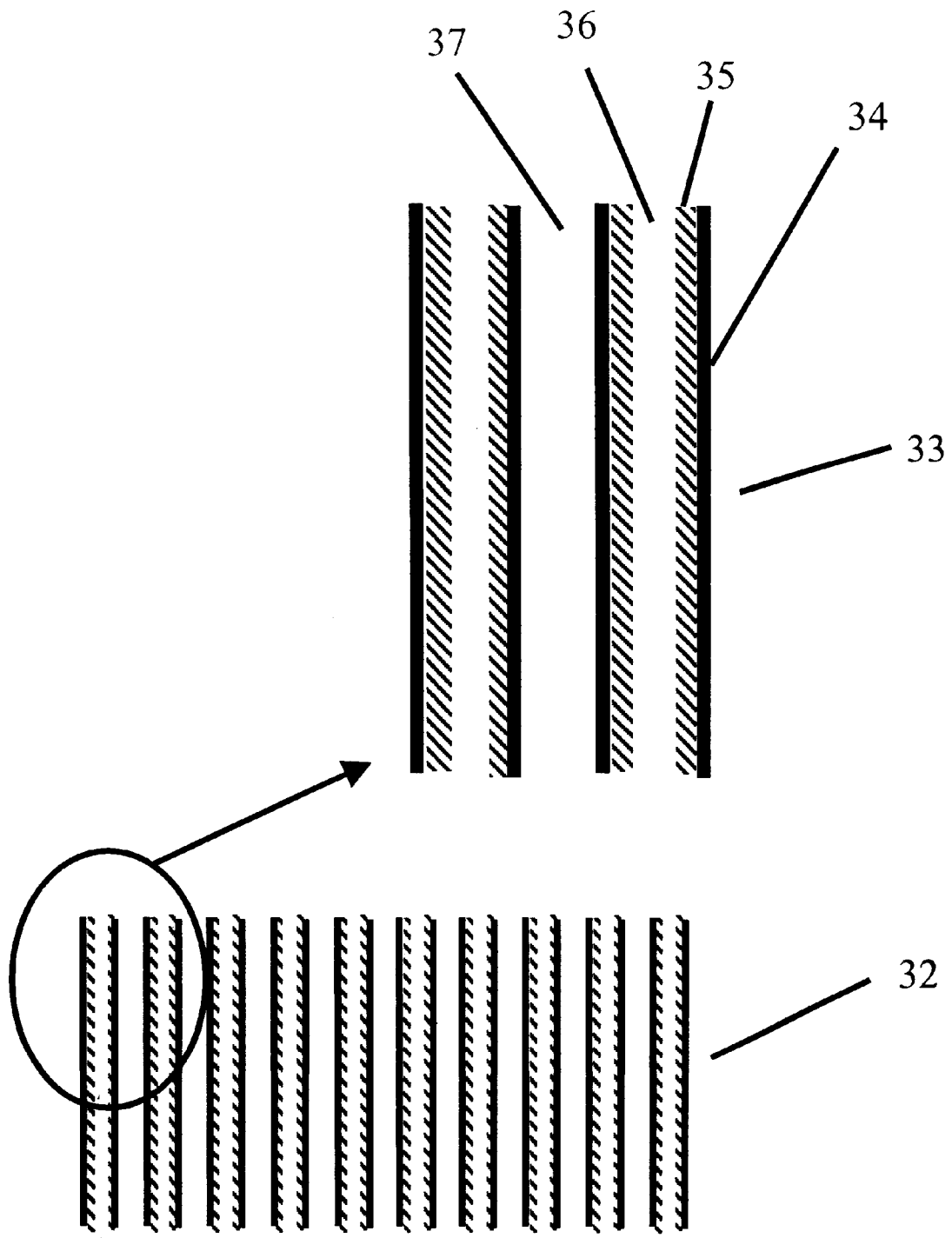
FIG. 3 is a design of a catalyst suitable for use in the present invention, as shown in a sectional side elevation view, and an enlarged sectional side elevation view.

Keeping within the scope of the present invention, the exact design of the present catalyst 6 can take a number of forms. FIG. 3 shows one particular design. Catalyst unit 32 consists of an open channel honeycomb structure with a portion of the structure shown in an enlarged view (33). The honeycomb structure comprises walls coated on one side with a catalyst layer 35. Catalyst layer 35 may be applied on the channel walls to form channels 36 that are catalyst coated and channels 37 that are not catalyst coated. This structure is then repeated to form the entire catalyst unit 32. The structure of catalyst unit 32 may have the following advantages. When the fuel is sprayed into the inlet face of this structure, some of the fuel will enter catalyst coated channels 36, where a substantial portion of these fuel droplets would impact the catalyst surface and may advantageously react catalytically. Since channels 37 of the catalyst unit are not coated with catalyst, little catalytic reaction will occur therein, but additional heat exchange from the catalyst coated side will occur thus limiting the overall temperature rise of the catalyst structure. However, the non-catalyst coated wall 37 would still act to vaporize the liquid fuel since the catalyst structure is at a high temperature. All the channels shown in catalyst structure 32 are preferably open to the fuel injector 26 (FIG. 2) and to the combustion chamber 22 (FIG. 2) and the flow direction of the vaporized fuel air mixture will be generally governed by the gas phase mass flow.

Figure 4:
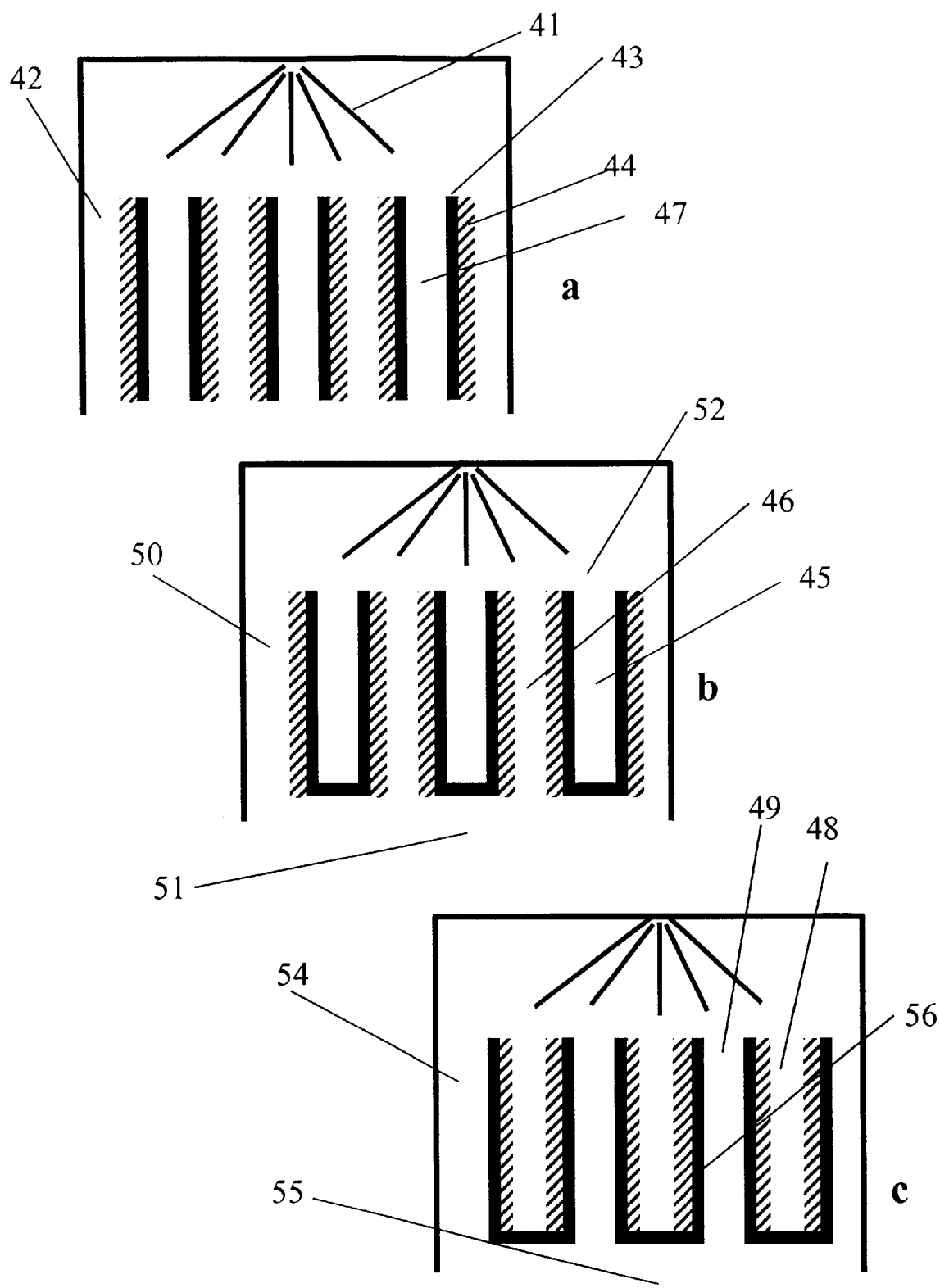
FIGS. 4a, 4b and 4c are illustrations of different preferred catalyst structures.

FIGS. 4a to 4c show several different catalyst structures that may have advantages in this inventive process. The previous structure of FIG. 3 is shown as FIG. 4a with fuel injection spray 41 impacting catalyst structure 42. Catalyst structure 42 preferably comprises a monolithic honeycomb with walls 43 coated with catalyst 44.

Catalyst structure 50 shown in FIG. 4b has an optional modification in which the non-catalyst coated walls of channels 45 are sealed at end 51 while catalyst coated walls of channels 46 are open. In this structure, the fuel droplets that impact the non-catalyst coated channels 45 will vaporize and be ejected in the space 52 above catalyst structure 50 and must then flow through the catalytic channels 46 to enter the main combustion chamber 53. This type of catalyst design may advantageously vaporize a large fraction of the fuel in the non-catalytic channels 45 then react this fuel as a fuel-air mixture upon passage through the catalytic channels 46. Since the catalytic reaction of the fuel and oxygen does not produce NOx, this structure may produce less NOx then catalyst structure 42 (FIG. 4a) where a significant portion of the fuel air mixture may exit catalyst 42 through non-catalytic channels 47 without reaction on the catalyst.

Catalyst structure 54 in FIG. 4c has the catalytic channels 48 closed while the non-catalytic channels 49 are open. Fuel droplets that enter the catalytic channels will have a high probability of reaction and will be forced around and through the non-catalytic channel to enter the main combustion chamber 55. Fuel droplets that enter non-catalytic channels 49 will thus have a high probability of striking hot non-catalytic wall 56 and vaporizing. This will provide the main combustion chamber 55 with a larger fraction of unreacted fuel air mixture but with a high fraction of vaporized fuel to enhance the mixing of the fuel and air.

Keeping within the scope of the present invention, many other designs are possible. In addition, the relative size of the catalytic and non-catalytic channels can be varied. For example, in FIG. 3, the channels are shown to be approximately equal in size or 50/50 catalytic and non-catalytic. If the open frontal surface area of the catalyst coated channels is compared to the open frontal surface area of the catalyst-free channels, then this ratio would be 50% catalyst coated and 50% catalyst free. By suitable construction of the catalytic module, the catalyst-coated fraction can be varied from as little as 5% to as high as 95%. In practical use, the range of percentage of catalyst coated channels would most likely be 20% to 80%. This range can also be applied to structures 50 (FIG. 4b) and 54 (FIG. 4c) and to any other structure envisioned. In addition, a non-channel but random foam like structure could be used. Such structure may have advantages in ease of fabrication and may still offer many of the advantages described herein.

Figure 5:
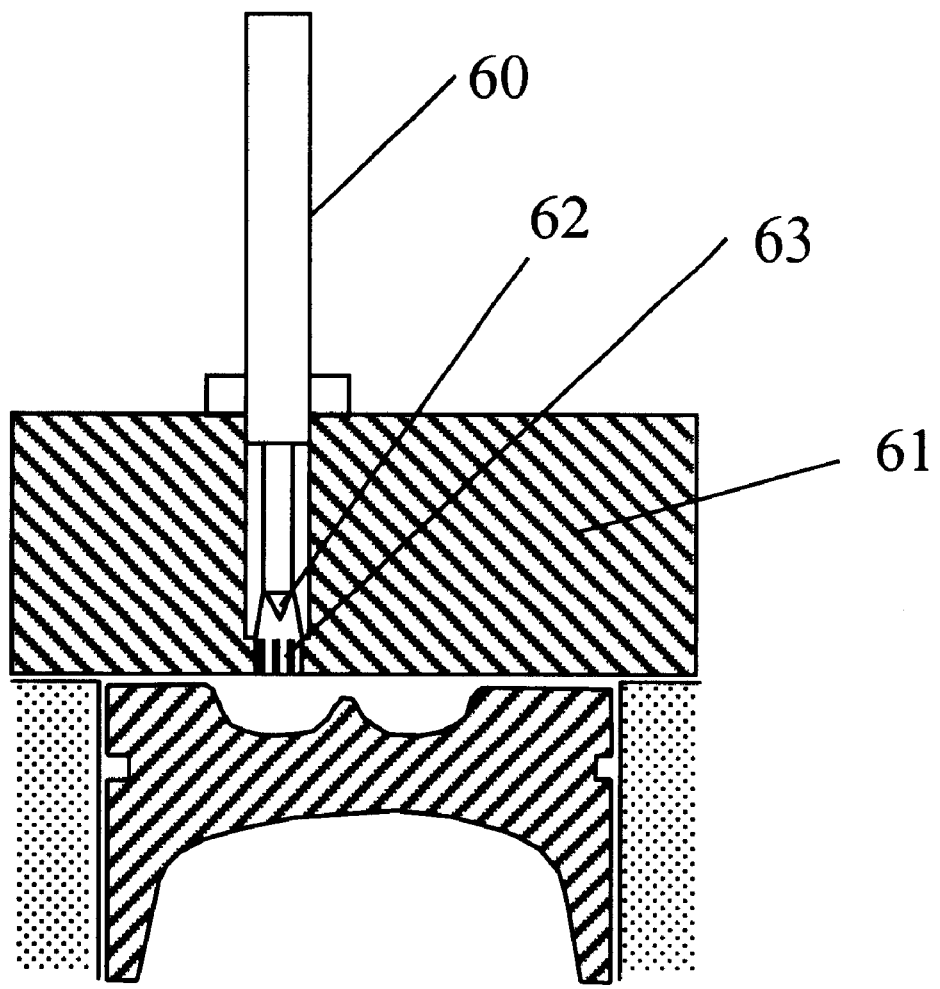
FIG. 5 is an exemplary embodiment of the present system in which the catalytic unit is an integral part of the fuel injector.

An exemplary implementation of the present system is shown in FIG. 5, in which the catalytic unit is an integral part of the fuel injector. Specifically, fuel injector 60 is mounted in cylinder head 61. Fuel injector 60 includes fuel injector nozzle 62 and catalyst unit 63. The particular configuration shown in FIG. 5 is conceptually similar to those shown in FIGS. 1 and 2 but shows a specific manner by which the catalyst unit could be integrated into the diesel engine. The system configuration of FIG. 5 would allow for easy exchange of the catalyst unit by simply removing the injector 60 and replacing the entire injector unit or by removing injector 60, replacing the catalyst unit 63 and then replacing the injector with the new catalyst unit.

The catalyst units shown in FIGS. 1 through 5 can be formed of metal or ceramic. Metal is preferred since it is more resistant to the stresses resulting from thermal gradients during the injection and combustion process. The metal structures can be formed by casting, by machining from a larger section of metal or can be formed from a thin foil by corrugating and spiral winding and then using as wound or by further processing by welding or brazing. The channels of the catalyst unit may typically be in the range of 0.002 inch to 0.5 inch diameter, preferable in the range of 0.01 to 0.25 inch diameter and most preferably from 0.02 to 0.15 inch diameter. The catalyst unit length (i.e. length of channels from one face of the catalyst unit to the opposite face for parallel straight channels) may typically be 0.02 inch to 1.0 inch and preferably 0.1 inch to 0.5 inch. The catalyst unit diameter may typically be between 0.1 inch and 1 inch and preferably between 0.25 and 0.5 inch.

The catalyst units described herein have a catalyst coating on at least a portion of the surface of the catalyst unit. The catalyst can be chosen from a number of catalyst compositions that are active for catalytic combustion of hydrocarbon fuels. Active catalytic elements include the Group VIII elements of the Periodic Table such as iron, cobalt, nickel, ruthenium, rhodium, palladium, osmium, iridium and platinum. Preferred Group VIII elements include cobalt, nickel, rhodium, palladium and platinum. Most preferred elements include palladium and platinum. The active catalytic element may be applied directly as a thin coating on the interior surface of the channels of the catalytic units shown in FIGS. 3 and 4. The catalyst can be applied by spraying, vapor deposition of the element, chemical vapor deposition, plasma spraying, coating with a paint containing the active catalytic element or other processes known to those skilled in the art. Alternatively, the catalytic coating can consist of a thin porous layer of a refractory oxide with a portion of its surface coated with the active catalytic element as described above. The refractory oxide may be selected from aluminum oxide, silicon oxide, zirconium oxide, titanium oxide, cerium oxide, mixtures of these oxides or these oxides or mixtures combined with a third additive such as yttrium, lanthanum, tantalum, magnesium or calcium, for instance. Preferred compositions are aluminum oxides, aluminum silicon oxide mixtures, zirconium oxides or zirconium cerium oxides mixtures. The refractory oxide can be applied first, the catalyst unit heat treated and then the active catalytic element added in a second step. Alternatively, the refractory oxide can be coated with the active catalytic element and the combination heat treated and this combination then applied to the internal surfaces of the catalytic unit.

Catalyst structures or units of the invention may be formed according to U.S. Pat. Nos. 5,258,349, 5,511,972, and 5,512,250, each of which is incorporated in its entirety herein. The structures disclosed in these patents include spiral-wound catalyst structures and corrugated structures that aid in inducing mixing in the gaseous stream passing through the structures. A graded catalyst can be placed on any of the supports of these patents or this patent application as well. Further, if desired, a catalyst structure may have an oxidation catalyst along channels near the inlet or the outlet face of the catalyst structure and a reduction catalyst along channels near the opposite face. This type of catalyst structure can be made by e.g. dipping one face of a support structure into a washcoat containing the oxidation catalyst, drying the washcoat, and dipping the opposite face of the support structure into a washcoat containing the reduction catalyst.

As described earlier, the catalytic unit may preferably be used to reform a portion of the fuel to produce hydrogen. In this case, the preferred active catalytic element is selected from nickel and rhodium and a mixture of these. If it is desired to have both oxidation and reforming activity, then a combination of the oxidation and reforming active components is desirable. Preferred compositions are a mixture of two or more of the elements or compounds containing palladium, platinum, rhodium and nickel. The amount of oxidation component is preferably sufficient to raise the catalyst temperature to about 550 to 700 C., and the amount of reforming catalyst component typically is sufficient to convert an amount of the remaining fuel to hydrogen and other reducing equivalents that aids in controlling combustion in the combustion chamber. It should be noted that under the conditions of preparation and operation, these catalytic components may exist as the reduced metal or as the oxide depending on the temperature and the gas composition. The element name is used here for simplicity and convenience and not to constrict the meaning to include only one oxidation state.

Further advantages of the present invention when applied to a diesel engine may include one or more of the following:

The partial reaction of fuel on the catalyst surface will not produce NOx and this will reduce the total NOx produced in the remaining fuel combustion that occurs in the main combustion chamber. This partial reaction on the catalyst surface will also serve to maintain the temperature of and also further heat the catalyst structure.

The interaction of the fuel droplets and the hot catalyst structure will enhance vaporization of the liquid fuel.

The partial reaction of fuel within the catalyst structure will heat the surrounding gas mixture and cause this fuel-air mixture to be expelled into the main combustion chamber enhancing mixing of the fuel and air.

The partial reaction of the fuel and air on the catalyst will heat the mixture charge that will then be expelled into the main combustion chamber. This heated fuel-air mixture will have a higher flame speed, a shorter ignition delay time and a lower lean blow out limit. All of these attributes will allow the engine to be operated with lower fuel/air ratio and operation at a lower fuel air ratio will allow the engine to produce lower NOx levels. For a discussion of this, see the reference Society of Automotive Engineering, SAE 2000-01-1177, "Minimum Engine Flame Temperature Impacts on Diesel and Spark-Ignition Engine NOx Production", by P. Flynn, G. Hunter, R. Durrett, L. Farrell and W. Akinyemi.

For the effect of heating the fuel-air mixture on the combustion process, see the book by A. H. Lefebvre, "Gas Turbine Combustion", Taylor and Francis Publishers, 1983, Bristol, Pa. FIG. 2.7 on page 48 shows a substantial increase in laminar burning velocity as temperature is increased for hydrocarbon-air mixtures. Also, FIG. 6.13 on page 192 shows a significant decrease in weak-extinction limit or lean blow out limit as the temperature in decreased. Both of these effects will allow the engine to be operated with a leaner mixture and thus a lower flame temperature which would produce lower NOx levels.

Recent developments in the control of diesel engines includes the concept of injecting small quantities of fuel, so called pilot injection, to initiate the combustion process, and smooth out the sudden violent combustion spike when the main fuel pulse in injected. This pilot injection pulse must be of a certain minimum size to get combustion. If a smaller pilot injection pulse is desired, it could not be used (without a catalyst) because it may be below the minimum fuel air ratio necessary for combustion. However, using a catalyst does not require a minimum fuel air ratio since the catalyst will combust or partially combust any amount of fuel.

Accordingly, the present system allows very small pilot injection pulses to be used if desired. This could be an advantage in the optimization of the operation of diesel engines in particular in make the overall engine vehicle combination more drivable and user friendly.

By configuring the catalyst as an integral part of the fuel injector, the catalyst could be easily replaced by simply removing the injector from the engine and replacing the catalyst unit. The catalyst unit could be either an insert in the engine or an insert in the injector tip.

A catalyst system as discussed above may also be electrically heated to aid the performance of the catalyst upon engine start-up, as disclosed in U.S. Pat. No. 6,109,018. The catalyst is nearer to or at the temperature at which the catalyst is active when the catalyst is heated, and a heated catalyst also aids in evaporating fuel droplets as the engine is started, leading to fewer unwanted emissions from the engine.

As discussed above, U.S. Pat. No. 5,307,772 describes a catalyst placed in the combustion chamber of a diesel engine, specifically in a prechamber or in the throat between the prechamber and the main cylinder chamber of an indirect injection engine or in the top of the piston of a direct injection engine. The catalyst pot of the '772 patent is configured differently from the catalyst structure of the present invention, in part because of the differences in the way an engine of the invention is configured compared to an engine disclosed in the '772 patent. The prechamber of the indirect injection engine of the '772 patent has a large volume and, as described in the '772 patent, a significant amount of the combustion occurs in this prechamber. The catalyst of the present invention may be much smaller and is placed between the fuel injector and the main combustion chamber in which the majority of combustion takes place in the direct injection engine of the invention. The fuel is injected through the catalyst with typically very little of the fuel combusting in the region between the injector and the catalyst. Some portion of the fuel is combusted within the catalyst and most of the fuel is combusted after or downstream of the catalyst in the main chamber. In the '772 patent, the major amounts of NOx are said to be formed in the prechamber and then to pass through the catalyst on the way to the prechamber. According to the '772 patent, this mixture is reducing and the catalyst is designed to reduce the NOx to $N_2$. While this may reduce a portion of the NOx it is believed that this configuration would not impact the NOx formation during the remainder of the combustion process in the main part of the cylinder because the mixture in this portion could not pass through the catalyst to the prechamber of higher pressure. In addition, the catalyst of the '772 patent is described as being contained in a prechamber, and prechamber engines have severe disadvantages, in particular, lower efficiency. The low efficiency is partly due to the pressure drop or flow restriction as the combustion gases flow from the prechamber to the main chamber, and it is believed that efficiency could be reduced even further due to the pressure drop that the combusted mixture would experience as it passed from the prechamber to the main combustion chamber. Lastly, the catalyst described in the '772 patent consists of a monolith and is fully coated with catalyst on all surfaces, and all channels are continuous from inlet to outlet. The '772 patent does not envision that a catalyst can be configured to impact the combustion process by vaporizing the fuel, nor does it envision a catalyst that could partially reform the fuel to produce components that would advantageously impact the combustion process. In addition, this patent does not envision that a catalyst could be designed that would limit the combustion temperature by using adjacent channels with no catalyst coating to act as heat exchange surfaces.

The invention is not limited to applications to a diesel engine. A catalyst structure of the invention may be used in a spark-ignition engine, especially a lean-burn spark ignition engine utilizing direct fuel injection. Fuel may be vaporized, partly combusted, and/or reduced to produce hydrogen and other species as described for the catalyst structure above. In such a lean-burn spark-ignition engine, the catalyst structure is positioned beneath the fuel injector as in the diesel engine, and the catalyst may promote some catalytic combustion of the fuel, catalytic reduction of the fuel, and/or vaporization of fuel droplets generated by the fuel injector. The chamber between the fuel injector and the catalyst (in either the diesel engine or spark-ignition engine) is typically much smaller than the minimum volume of the combustion chamber (as measured when a piston is at top-dead-center, for instance). The majority of combustion thus occurs in the main combustion chamber beneath the catalyst, in which a spark plug is positioned to ignite the remaining mixture in the spark-ignition engine. A fuel injection system incorporating a catalyst as described above may be used in other applications where a liquid fuel such as gasoline, diesel, kerosene, or heating fuel is used.

This application incorporates by reference the various references (including patents) discussed throughout the specification as if those references were fully put forth herein. This application also incorporates by reference the PCT application corresponding to this application and filed with the U.S. Receiving Office on even date herewith, entitled "Catalyst Placement In Combustion Cylinder For Reduction of NOx And Particulate Soot," inventor R. Dalla Betta.

What is claimed is:

1. A fuel injection system for reducing emissions generated by combusting a fuel, said fuel injection system comprising a fuel injector and a catalyst unit for reducing emissions generated by combusting a fuel, said catalyst unit comprising a support having therethrough a plurality of through-holes formed by sidewalls of the support and a catalytically-effective amount of a catalyst on a portion of said sidewalls such that at least one catalyst-coated through-hole is adjacent at least one through-hole having no catalyst coating, said catalyst unit having a size suitable for placement in a reciprocating engine, wherein said catalyst unit is positioned downstream of the fuel injector a distance such that the catalyst unit receives a liquid fuel droplet and vaporizes the liquid fuel droplet at operating conditions, and is attached to the fuel injector.

2. The system of claim 1, wherein the catalyst comprises a metallic support.

3. The system of claim 1, wherein the open frontal area of catalyst-coated channels is between 20% to 80% of the total catalyst-coated channel area and catalyst-free channel area.

4. The system of claim 1, wherein the catalyst unit is removable from the fuel injector and can be replaced or exchanged.

5. A reciprocating engine comprising a piston and a fuel injection system according to claim 4, wherein the piston is positioned downstream of said fuel injection system.

6. The system of claim 1, wherein the catalyst unit is a separate unit that is inserted into a head of the engine prior to installing the injector.

7. A reciprocating engine comprising a piston and a catalyst structure according to claim 1, wherein the catalyst structure is positioned upstream of said piston such that at least a portion of the fuel enters the catalyst structure.

8. A reciprocating engine comprising a piston and a fuel injection system according to claim 1, wherein the piston is positioned downstream of said fuel injection system.

9. A method of combusting a fuel mixture in a reciprocating engine having a fuel injector and a movable piston comprising:

injecting liquid fuel onto an inlet face of a catalyst unit having channels, said catalyst unit being positioned downstream of the fuel injector between the fuel injector and the piston, reacting a first portion of the fuel on the catalyst unit, and expelling a remaining fuel portion toward the piston, wherein the act of expelling the remaining fuel portion toward the piston comprises passing said remaining fuel portion through said catalyst unit, wherein interior surfaces of a portion of the channels are coated with a catalyst and interior surfaces of the remaining channels are not coated with catalyst such that said interior surfaces of the catalyst-coated channels are in heat exchange relationship with said interior surfaces of the adjacent catalyst-free channels, and wherein the catalyst-coated channels are closed at the outlet face of the catalyst unit and the catalyst-free channels are open at the outlet face of the catalyst unit.

10. The method of claim 9, wherein the channels of the catalyst unit are formed by a plurality of walls which form a multitude of adjacently disposed longitudinal channels extending from the inlet face of the catalyst unit to the outlet face of the catalyst unit.

11. The method of claim 9, wherein the catalyst unit comprises a substrate made of metal.

12. The method of claim 9, wherein the open frontal area of catalyst-coated channels is between 20% to 80% of the total catalyst-coated channel area and catalyst-free channel area.

13. The method of claim 9 wherein the act of reacting said portion of the fuel on the catalyst unit comprises reacting the fuel to generate hydrogen.

14. A method according to claim 9 and further comprising injecting a small quantity of pilot fuel into the catalyst unit to combust and heat the catalyst unit prior to said acts of reacting and expelling.

15. A method according to claim 9, wherein a portion of the fuel is combusted in the catalyst unit and a majority of the fuel is combusted in the combustion chamber.

16. A method according to claim 15 and further comprising reacting a portion of the fuel in the catalyst unit to generate hydrogen.

17. A method according to claim 9, wherein the act of expelling the remaining fuel portion toward the piston comprises passing said remaining fuel portion through said catalyst unit.

18. A method according to claim 17 wherein the catalyst unit generates hydrogen.

19. A method of combusting a fuel mixture in a reciprocating engine having a fuel injector and a movable piston comprising:

injecting liquid fuel onto an inlet face of a catalyst unit having channels, said catalyst unit being positioned downstream of the fuel injector between the fuel injector and the piston, reacting a first portion of the fuel on the catalyst unit, and expelling a remaining fuel portion toward the piston, wherein the act of expelling the remaining fuel portion toward the piston comprises passing said remaining fuel portion through said catalyst unit, wherein interior surfaces of a portion of the channels are coated with a catalyst and interior surfaces of the remaining channels are not coated with catalyst such that said interior surfaces of the catalyst-coated channels are in heat exchange relationship with said interior surfaces of the adjacent catalyst-free channels, and wherein the catalyst-free channels are closed at a face of the catalyst unit and the catalyst-coated channels are open at the outlet face of the catalyst unit.

20. The method of claim 19, wherein the open frontal area of catalyst-coated channels is between 20% to 80% of the total catalyst-coated channel area and catalyst-free channel area.

21. A fuel injection system for reducing emissions generated by combusting a fuel, said fuel injection system comprising a fuel injector and a catalyst unit for reducing emissions generated by combusting a fuel, said catalyst unit comprising a support having therethrough a plurality of through-holes formed by sidewalls of the support and a catalytically-effective amount of a catalyst on a portion of said sidewalls such that at least one catalyst-coated through-hole is adjacent at least one through-hole having no catalyst coating, said catalyst unit having a size suitable for placement in a reciprocating engine, wherein the catalyst-coated channels are closed at an outlet face of the catalyst unit and the catalyst-free channels are open at an outlet face of the catalyst unit, and wherein said catalyst unit is positioned downstream of the fuel injector a distance such that the catalyst unit receives a liquid fuel droplet and vaporizes the liquid fuel droplet at operating conditions.

22. The system of claim 21 wherein the open frontal area of catalyst-coated channels is between 20% to 80% of the total catalyst-coated channel area and catalyst-free channel area.

23. A fuel injection system for reducing emissions generated by combusting a fuel, said fuel injection system comprising a fuel injector and a catalyst unit for reducing emissions generated by combusting a fuel, said catalyst unit comprising a support having therethrough a plurality of through-holes formed by sidewalls of the support and a catalytically-effective amount of a catalyst on a portion of said sidewalls such that at least one catalyst-coated through-hole is adjacent at least one through-hole having no catalyst coating, said catalyst unit having a size suitable for placement in a reciprocating engine, wherein the catalyst-free channels are closed at a face of the catalyst unit and the catalyst-coated channels are open at an outlet face of the catalyst unit, and wherein said catalyst unit is positioned downstream of the fuel injector a distance such that the catalyst unit receives a liquid fuel droplet and vaporizes the liquid fuel droplet at operating conditions.

24. The system of claim 23, wherein the open frontal area of catalyst-coated channels is between 20% to 80% of the total catalyst-coated channel area and catalyst-free channel area.

* * * * *